No. 773,043. PATENTED OCT. 25, 1904.
W. V. TURNER.
TRIPLE VALVE FOR AIR BRAKE SYSTEMS.
APPLICATION FILED JAN. 2, 1903.
NO MODEL.
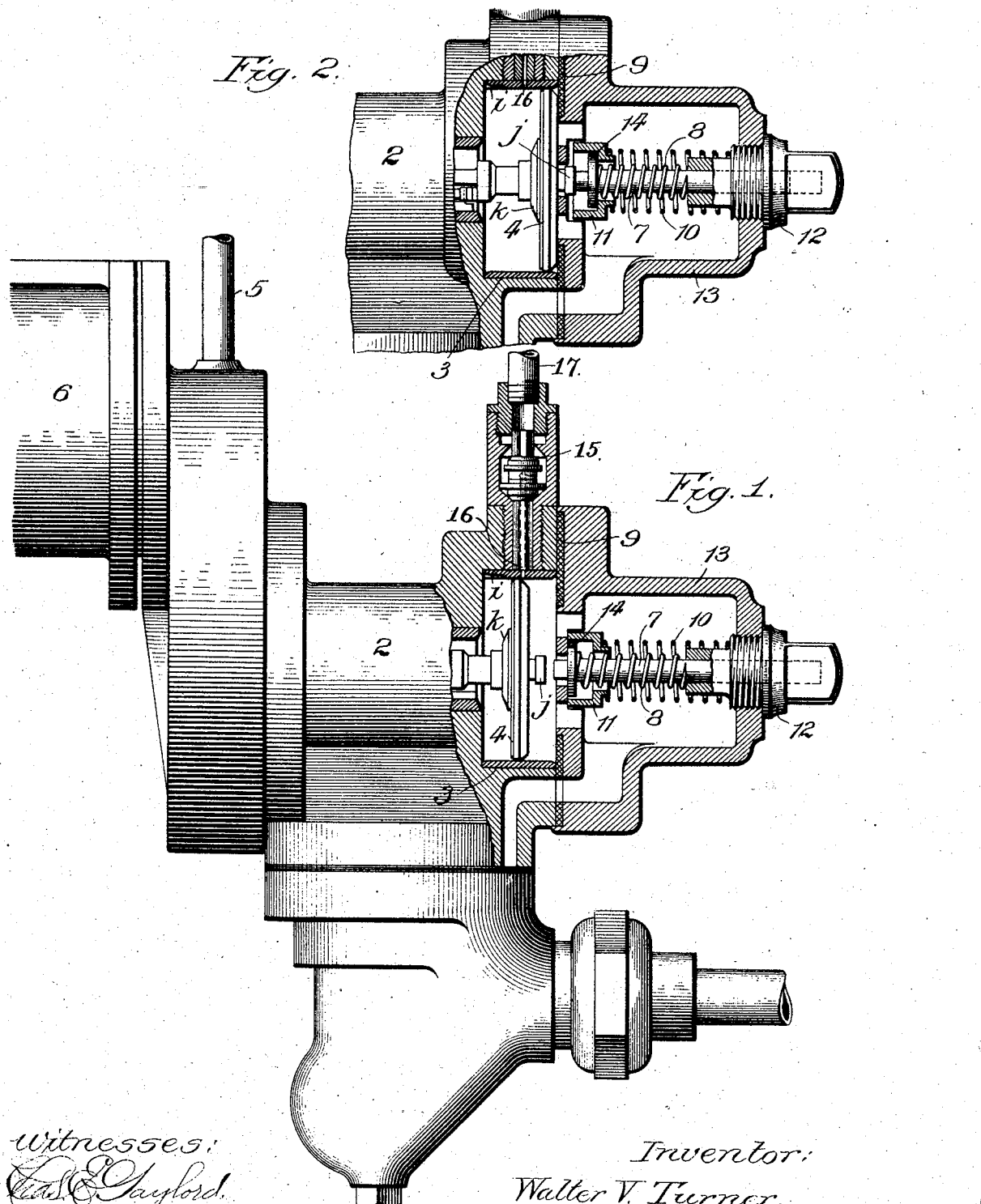
Witnesses:
Inventor:
Walter V. Turner,
By Thomas F. Sheridan,
Att'y No. 773,043.                                                          Patented October 25, 1904.

UNITED STATES PATENT OFFICE.

WALTER V. TURNER, OF TOPEKA, KANSAS, ASSIGNOR TO THE WESTING-HOUSE AIR BRAKE COMPANY, OF PITTSBURG, PENNSYLVANIA, A CORPORATION OF PENNSYLVANIA.

TRIPLE VALVE FOR AIR-BRAKE SYSTEMS.

SPECIFICATION forming part of Letters Patent No. 773,043, dated October 25, 1904.

Application filed January 2, 1903. Serial No. 137,553. (No model.)

*To all whom it may concern:*

Be it known that I, WALTER V. TURNER, a citizen of the United States, residing at Topeka, in the county of Shawnee and State of Kansas, have invented certain new and useful Improvements in Triple Valves for Air-Brake Systems, of which the following is a specification.

This invention relates to triple-valve devices for air-brakes, and more particularly to that class known as "quick-action" triple valves, wherein a local venting of the train-pipe occurs at each triple valve in emergency applications of the brakes. In the present standard triple-valve devices of this type, as is well known, the main triple piston moves in response to a gradual reduction of train-pipe pressure to an intermediate position, known as "service" position, in which communication is established from the auxiliary reservoir to the brake-cylinder, and in this position the stem of the piston touches the stem of the graduating-spring, which tends to prevent further rearward movement of the piston. In emergency applications, however, the piston is moved by a sudden reduction of train-pipe pressure to the extreme end of its traverse, compressing the graduating-spring and seating itself against the usual gasket at the rear end of the piston-chamber. When seated in this position, the effective area of the piston exposed to train-pipe pressure is reduced to the extent of the surface engaging the gasket. Consequently when it is desired to release the brakes after an emergency application or after a full service application, in which the train-pipe pressure is reduced below the equalized pressure of the auxiliary reservoir and brake-cylinder, it is not only necessary to raise the train-pipe pressure to equal that of the auxiliary reservoir, but it must be increased several pounds higher than that of the auxiliary reservoir in order to operate to compensate for the diminished area of the piston exposed on the train-pipe side and force the same away from the gasket.

While it is necessary that the piston should seat against the gasket in emergency applications, due to a bursted hose or other accident in which the train-pipe is emptied to the atmosphere, in order to prevent the leakage of the air-pressure from the auxiliary reservoir to the train-pipe, still in ordinary emergency applications this diminishing of the effective area of the train-pipe face of the piston by its engagement with the gasket causes a delay in the release of the brakes, which is at times quite objectionable.

The principal object of this invention is the provision of supplemental means, such as a spring, tending to resist the final part of the movement of the triple piston to its "emergency" position against the gasket and acting to assist the train-pipe pressure and graduating spring to overcome the opposing auxiliary-reservoir pressure and move the piston away from the gasket when it is desired to release the brakes. When a recharging device is employed for recharging the auxiliary reservoir from the train-pipe while the brakes remain applied and without moving the triple valve to release position, it is desirable to have the recharging-passage connected to the piston-chamber just at the rear of the normal lap position of the triple piston or between lap position and emergency position. By this means the recharging device is entirely cut out in the emergency position, and there is no chance of leakage from the auxiliary reservoir to the train-pipe through the recharging-passage. With such a recharging device applied to the present standard triple-valve structure it is impossible to recharge the auxiliary reservoirs after an emergency application without releasing the brakes, for the reason that as soon as the train-pipe pressure is increased sufficiently to move the piston away from its gasket it predominates over the auxiliary-reservoir pressure by several pounds and immediately carries the piston to release position.

By means of my improvement, in which the triple piston is moved away from its seat against the gasket when the train-pipe pressure is substantially equal to that of the auxiliary reservoir, the usual graduating-spring assists in moving the piston to lap position only, and there it may be stopped, while the recharging-port is opened, and the auxiliary reservoir may then be recharged by a very slow feeding of air to the train-pipe without moving the triple valve to release position, the release being effected by the usual increase of train-pipe pressure whenever desired.

In the accompanying drawings, Figure 1 is an elevation, partly in section, showing a quick-action triple valve constructed and arranged in accordance with these improvements and with the parts in what is known as "lap" position; and Fig. 2, a detail thereof with the parts arranged in emergency position.

In constructing a quick-action triple valve in accordance with these improvements I use a valve-body 2, in which are seated the usual well-known slide and graduating valves. Attached to and forming a part of the valve-body is a cylinder 3, provided with a cylinder-chamber, in which the main piston 4 operates.

To control the admission of air under pressure to the auxiliary reservoir through pipe 5 and from the auxiliary reservoir to the brake-cylinder 6, the slide and graduating valves, above alluded to, are arranged in the usual and well-known manner and need no further illustration or description here further than to say that the air under pressure passes around the main piston when the parts are in "release" position by means of the usual feed-grooves $i$ and $k$ and into the auxiliary reservoir by means of the pipe 5, from whence it is drawn as needed for use in the brake-cylinder 6.

It is well known in this art that when the engineer gradually reduces the train-pipe pressure the superior pressure on the auxiliary reservoir side of the main piston causes it to be moved until the service-port is opened from the auxiliary reservoir to the brake-cylinder and the stem $j$ encounters the graduating-stem 7, which, through the resistance of its graduating-spring 8, prevents further movement thereof and holds the parts at what is known as "service" position; but when a sudden reduction of train-pipe pressure is had the superior pressure on the auxiliary-reservoir side of such main piston causes it to be moved so quickly that it compresses the graduating-spring, so that such piston moves to emergency position, as shown in Fig. 2. In this position the train-pipe side of the main piston is seated against the cylinder-cap gasket 9, which reduces the effective area of such side of the piston, and thereby requires a considerable increase of the train-pipe pressure above that of the auxiliary reservoir when it is desired to release. In order to facilitate the release movement of the triple piston and valve, a supplementary spring 10 is provided, coiled about the primary graduating-spring and interposed between a shouldered sleeve 11 and the graduating-screw 12 of the cylinder-cap 13.

A recharging device, which may be of any desired construction, is indicated at 15 and communicates by a port 16 with the piston-chamber at a point in the rear of the lap position of the piston and is also adapted to communicate with the auxiliary reservoir by means of a pipe 17.

An examination of the drawings in connection with the foregoing description will show that the main piston may be moved, as heretofore, to emergency position without encountering any increased resistance until just as it reaches the limit of motion in that direction, when the shoulder 14 of the graduating-stem engages the shouldered sleeve and the supplementary graduating-spring is brought into action to compensate for the reduction of the superficial area of the train-pipe side of such piston.

The supplemental spring is preferably made of such strength as to substantially compensate for diminished area of the piston exposed to train-pipe pressure, so that in order to release the brakes after an emergency application it will only be necessary to raise the train-pipe pressure to substantially equal that of the auxiliary reservoir, when the piston will be moved away from the gasket. If the train-pipe pressure is then raised very slowly, the triple piston will be moved by the graduating-spring only to lap position, where it will stop, with the recharging-passage 16 open, and the auxiliary reservoir may then be recharged to any extent desired without releasing the brakes; but if it is desired to release immediately the train-pipe pressure will be increased more rapidly, as in the usual way, and the triple valve will be forced all the way over to release position.

From the foregoing description it will now be apparent that by means of my improvement the brakes may be readily released after an emergency application, or, if desired, a recharging of the auxiliary reservoir may be had without moving the triple valve to release position.

Having now described my invention, what I claim as new, and desire to secure by Letters Patent, is—

1. A triple-valve device, comprising a main piston, means for diminishing the effective area thereof exposed to train-pipe pressure when in emergency position, and supplemental means acting to assist the train-pipe pressure in moving the piston from its emergency position.

2. A triple-valve device, comprising a main piston subject to the opposing pressures of the auxiliary reservoir and train-pipe, means for diminishing the effective train-pipe area of the piston in its emergency position, and a spring acting only in emergency position to assist the train-pipe pressure in moving the piston in opposition to the auxiliary-reservoir pressure.

3. A triple-valve device, comprising a main piston operated by variations in train-pipe pressure, a graduating-spring tending to resist the movement of the piston to emergency position, means for diminishing the effective train-pipe area of the piston in emergency position, and a supplemental spring acting upon said piston in emergency position to assist the train-pipe pressure.

4. A triple-valve device, comprising a main piston operated by variations in train-pipe pressure, a graduating-spring tending to resist the movement of the piston to emergency position, a gasket forming a seat for the piston in its emergency position, and a supplemental spring acting upon the piston when in its emergency position to assist the train-pipe pressure in moving the piston away from the gasket.

5. A triple-valve device, comprising a main piston subject to the opposing pressures of the auxiliary reservoir and train-pipe, a gasket forming a seat for said piston in its emergency position, and a supplemental spring acting only in emergency position to assist the train-pipe pressure in moving the piston in opposition to the auxiliary-reservoir pressure.

6. A triple-valve device, comprising a main piston subject to the opposing pressures of the auxiliary reservoir and train-pipe, a gasket forming a seat for said piston in emergency position, a recharging-passage for the auxiliary reservoir leading from the piston-chamber between lap position and emergency position, and a supplemental spring acting on said piston in emergency position.

7. In a triple-valve of the class described, the combination of a valve-body and cylinder, a main piston movably mounted in such cylinder and responsive to variations of fluid-pressure in the train-pipe for moving the usual valve mechanism in the valve-body into and out of position to cause the operation of the brake mechanism, a cylinder-cap attached to the cylinder, a graduating-screw in the same, a graduating-stem having a shouldered inner end, a primary helically-coiled graduating-spring between the graduating stem and screw to form an initial yielding stop for the main piston, a shouldered sleeve surrounding the shouldered end of the graduating-stem and permitting a limited amount of independent movements of the stem, and a supplementary helically-coiled graduating-spring surrounding the primary spring arranged between the shouldered sleeve and graduating-screw to act as an increased or additional yielding stop for the main piston as it reaches its "emergency" position, substantially as described.

WALTER V. TURNER.

Witnesses:
R. J. HOWARD,
A. M. WARNER.